(12) United States Patent
Langston

(10) Patent No.: US 6,739,556 B1
(45) Date of Patent: May 25, 2004

(54) METHOD AND APPARATUS FOR PROVIDING AN AIRCRAFT EMERGENCY SAFETY CONTROL SYSTEM

(75) Inventor: James Leland Langston, Colorado Springs, CO (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/300,141

(22) Filed: Nov. 20, 2002

(51) Int. Cl.[7] .............................. G05D 1/10; B64C 13/20
(52) U.S. Cl. ...................................................... 244/189
(58) Field of Search .............................. 244/3.11, 3.14, 244/76 R, 189, 196, 197

(56) References Cited

U.S. PATENT DOCUMENTS

| | | | | |
|---|---|---|---|---|
| 2,446,149 A | * | 7/1948 | Wells | 91/33 |
| 2,620,148 A | * | 12/1952 | Baring-Gould et al. | 244/189 |
| 2,709,773 A | * | 5/1955 | Getting et al. | 318/16 |
| 3,082,978 A | * | 3/1963 | Smith et al. | 244/197 |
| 3,564,134 A | * | 2/1971 | Rue et al. | 348/39 |

* cited by examiner

Primary Examiner—Robert P. Swiatek
(74) Attorney, Agent, or Firm—Daly, Crowley & Mofford, LLP.

(57) ABSTRACT

A method and apparatus for providing an Aircraft Emergency Safety Control System (AESCS) capable of regaining control of an aircraft that may have been lost due to incapacitation of the crew includes an airborne segment, a ground segment, and a communications segment wherein control of the aircraft is removed from the control of unauthorized person(s) onboard the aircraft, and the aircraft is directed to a destination that is considered a safe location for the aircraft given it's status, and to facilitate a reasonably safe emergency landing.

28 Claims, 3 Drawing Sheets

METHOD AND APPARATUS FOR PROVIDING AN AIRCRAFT EMERGENCY SAFETY CONTROL SYSTEM

CROSS REFERENCE TO RELATED APPLICATIONS

Not Applicable.

STATEMENT REGARDING FEDERALLY SPONSORED RESEARCH

Not Applicable.

FIELD OF THE INVENTION

The present invention relates generally to aircraft control and, more specifically, to a method and apparatus for providing autonomous control of aircraft upon detection of an emergency situation onboard the aircraft.

BACKGROUND OF THE INVENTION

An airborne aircraft may suffer loss of control due to incapacitation of the crew. This may be caused by death of one or more crewmembers, a medical emergency, a hijacking, or other emergency situation. In the case of hijacking, the aircraft may be commandeered by unauthorized persons and used as a weapon as has been demonstrated. Such actions may even necessitate the destruction of the commandeered aircraft by military aircraft taking defensive measures.

Systems have been designed to control vehicles via Remote Control, as well as to control vehicles robotically. Examples include Remotely Piloted Vehicles (RPVs), also known as Unmanned Vehicles (UV), developed by the military, robotic vehicles sent to Mars by NASA, the use of artificial intelligence to guide missiles, autopilots capable of landing aircraft in poor weather conditions, and the like. However, no systems have been developed to provide auxiliary control of commercial aircraft in the case of emergencies. The primary reason for this is the perceived absence of a need to do so, as well as safety concerns. Recent events, however, have changed this view.

Within the current operational capability of aircraft, including commercial airliners, aircraft flight control is solely the responsibility of the crew onboard the aircraft. Airline safety has generally depended upon having at least two qualified pilots onboard the aircraft. In the event that one crewmember becomes disabled, the other crewmember is capable of operating the aircraft and bringing the aircraft to a safe landing. This method of using two crewmembers has worked well until recently. Even prior to the tragic events involving the hijacking and intentional crashing of an aircraft into a building, there has been at least one incident in which a pilot in command may have assumed control of the aircraft and caused it to intentionally crash. Novels and movies have addressed the issue of having both crewmembers incapacitated leaving the aircraft in perilous conditions. In certain situations, orders have been issued to destroy any aircraft that appears to pose a threat to a large population on the ground due to loss of positive control of the aircraft.

It would, therefore, be desirable to provide a method and apparatus by which autonomous control of an aircraft is implemented upon detection of an event which leaves the flight crew incapacitated, and wherein the aircraft is directed by autonomous means through an emergency landing procedure.

SUMMARY OF THE INVENTION

The present invention comprises a method and apparatus for providing an Aircraft Emergency Safety Control System (AESCS) capable of regaining control of an aircraft that may have been lost due to incapacitation of the crew. The baseline AESCS invention is comprised of three major segments: an airborne segment, a ground segment, and a communications segment. The airborne segment provides aircraft monitoring and status information to a ground control station via a communications link. The airborne segment augments existing electronic flight control systems to accept emergency navigation, guidance, and control instructions from a ground control station via the communications link. The airborne segment further provides an optional capability to disable cockpit control of selected systems.

The Ground Control Segment (GCS) of the present invention comprises one or more monitoring and control stations. The purpose of the GCS is to continuously monitor aircraft to determine abnormal flight patterns, detect threatening behavior onboard the aircraft, or otherwise determine situations which may pose a hazard to either the aircraft or ground locations. Once an emergency situation onboard the aircraft has been detected, the GCS can be used to provide a signal to the aircraft to change control of the aircraft from pilot control to autonomous control.

The communications segment provides a link between the aircraft and the GCS. The communications segment may comprise multiple complimentary and alternative communication channels. The communication link provides a way for interrogating the aircraft to extract critical information, pre-empt control of the aircraft from the onboard personnel, upload navigation and control data, monitor aircraft systems, and provide other monitoring functions such as video and audio from the cockpit and cabin to assess the situation aboard the aircraft. For positive control, two-way communications is desired, although one-way communication is also within the scope of the invention.

By way of the present invention, control of the aircraft is removed from the control of unauthorized person(s) onboard the aircraft, and the aircraft is directed to a destination that is considered a safe location for the aircraft given its status, and to facilitate a reasonably safe emergency landing. The present invention can make use of equipment which already exists on most commercial airliners, and adds electronic technology to provide an emergency control system for aircraft.

For smaller aircraft, a means is included to preempt the use of an aircraft as a weapon, but without the ability to guide the aircraft to a safe landing using an autonomous system. The system addresses safety issues on multiple fronts, and provides a means to reduce significantly the risk to both aircraft passengers and to people and property on the ground. Safety is enhanced, not only for situations involving a suicide hijacking, but also for situations that may arise due to aircraft malfunctions. The present invention provides a wide-ranging solution to many aviation safety issues using an integrated monitoring and control system that includes an airborne segment, a ground control segment and a communications segment.

BRIEF DESCRIPTION OF THE DRAWINGS

The invention will be more fully understood from the following detailed description taken in conjunction with the accompanying drawings, in which.

DETAILED DESCRIPTION OF THE INVENTION

The present invention comprises a method and apparatus for providing an Aircraft Emergency Safety Control System (AESCS) capable of regaining control of an aircraft that may have been lost due to incapacitation of the crew. Although such incapacitation can result from situations, such as a hostile take-over from person(s) onboard the aircraft, incapacitation of the crew may also result from a mechanical failure that renders the crew helpless. The present invention addresses not only safety from the perspective of loss of life and property on the ground due to hostile aircraft take-over, but also the safety of aircraft passengers in the event of a catastrophic mechanical failure onboard the aircraft. Even though the primary intent of the AESCS is to prevent take-over of the aircraft by hostile individuals, the system can also be used to detect and help control other emergency situations. For example, the inventive system can be used to provide separate ground support during emergency situations, such as mechanical problems, onboard medical emergencies, and the like.

The presently disclosed AESCS can remove control of the aircraft from persons onboard the aircraft and turn over control of the aircraft to a system that utilizes the onboard autonomous navigation controls, and which is directed by ground control points. The preferred approach is to use onboard electronic systems to navigate and control the aircraft as much as possible, although remote control piloting of the aircraft may also be utilized. A communications control link is provided as a means for changing the control mode of the navigation system of the aircraft from pilot control to autonomous ground control. The communications link also provides a way for interrogating the aircraft to extract critical information, for preempting control from the onboard personnel, for uploading navigation and control data, for monitoring aircraft systems and for providing other monitoring functions, such as video and audio from the cockpit and cabin, to assess the situation aboard the aircraft. The use of both one-way and two-way communications may be utilized to accomplish this. Various means of establishing and maintaining such communications links are included, as are certain fail-safe techniques. Various ground control and monitoring techniques are addressed, including the use of existing Air Traffic Control radar, transponder responses, VHF/UHF communications systems, satellite communications systems, and other techniques.

Most commercial airliners have sophisticated navigation and control systems capable of autonomously guiding the aircraft throughout a programed flight profile, including touchdown and landing. This autonomous control system, although available and used to guide aircraft in poor weather conditions, is used only under controlled conditions and carefully monitored by the onboard crew. For these types of aircraft, the most expensive elements of an AESCS are already provided.

Figure 1:
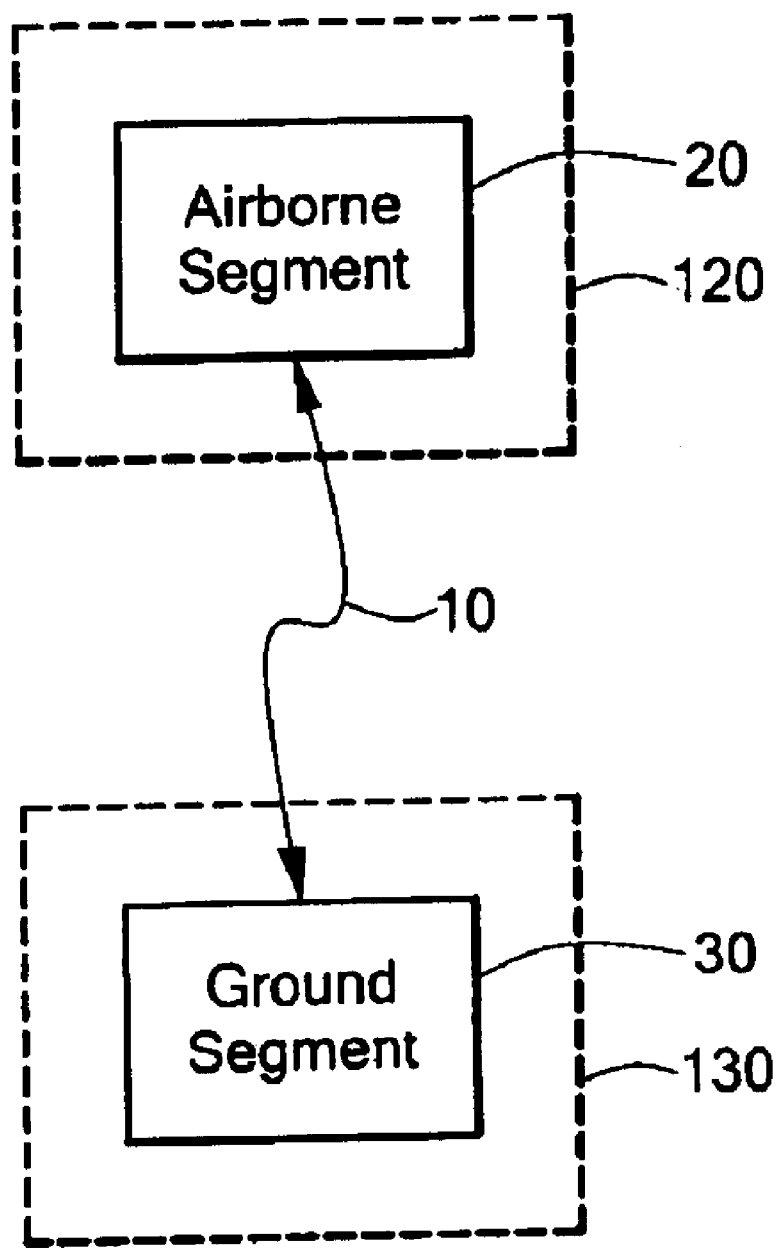
FIG. 1 is a high-level block diagram of the present invention.

Referring now to FIG. 1, the baseline AESCS invention is comprised of three major segments: an airborne segment 20, a ground segment 30, and a communications segment 10. The three system segments may encompass numerous implementation variations within each segment.

Figure 2:
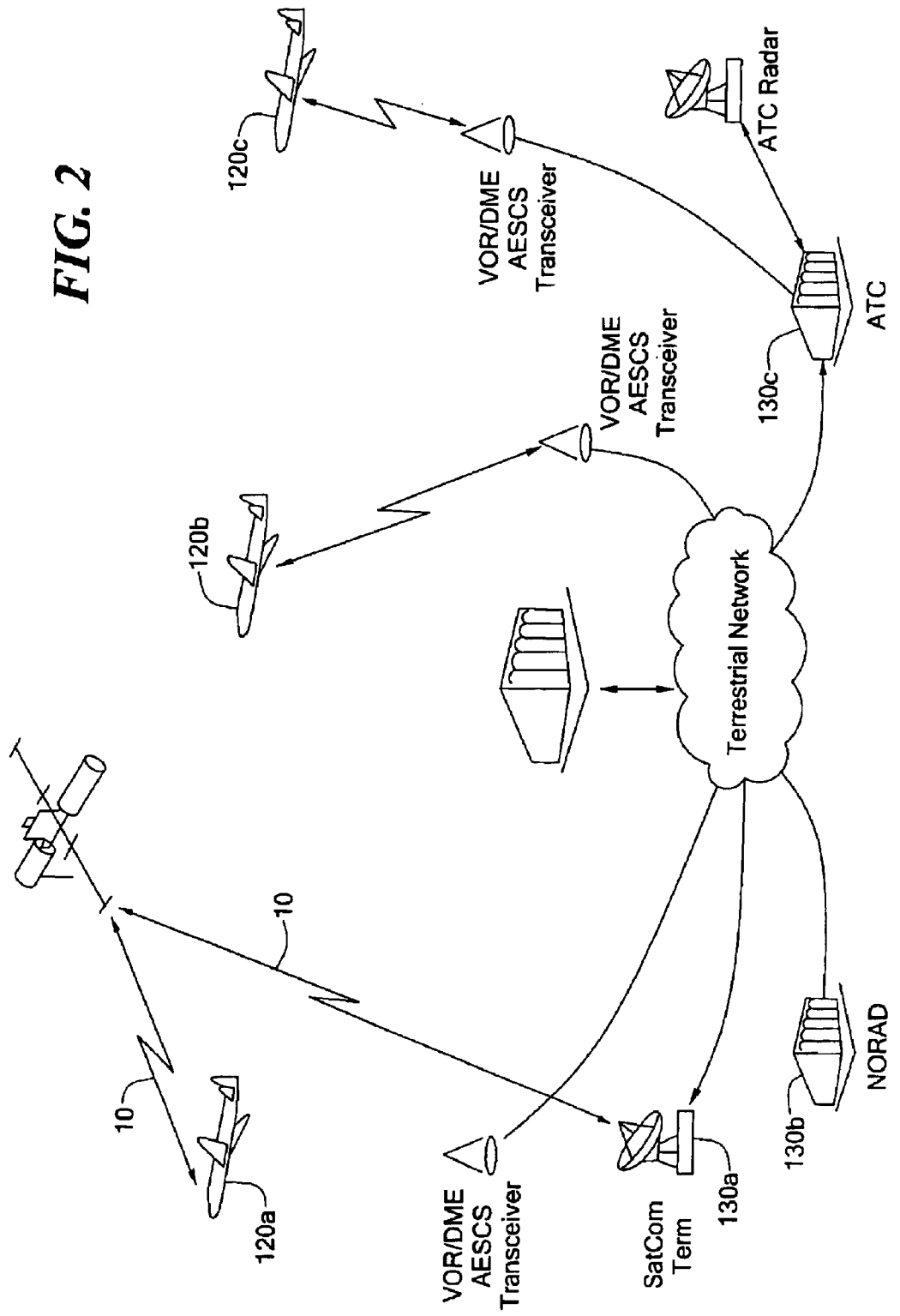
FIG. 2 is a detailed block diagram showing the segments of the present invention.

The airborne segment 10 of the invention is resident within aircraft 120 in FIG. 1 and 120, 120*b*, and 120*c*, in FIG. 2. The airborne segment performs several functions. The airborne segment 10 provides aircraft monitoring and status information to one or more ground segments 30 which are usually housed in a ground control station 130, 130*a*, 130*b* and 130*c*. Communication between the airborne segment and the ground segment is conducted via a communications link or channel 10, 10*a*, 10*b*, and 10*c*. The airborne segment 10 also augments existing electronic flight control systems to accept emergency navigation, guidance, and control instructions from a ground control station via the communications link 10. The airborne segment 10 further provides an optional capability to disable cockpit control of selected systems. The airborne segment may require modification of the airborne navigation system software to accommodate the necessary emergency control functions, and may further require additional hardware to facilitate emergency control of the aircraft.

The preferred airborne segment 10 comprises a three-dimensional navigation system, a full-control 3-axis autopilot, sensors for determining forward velocity, vertical velocity, roll, roll-rate, yaw, heading, angle of attack, ground speed, attitude and horizontal drift. In addition, the navigation and autopilot system is capable of vectoring the aircraft to programmed way points (including altitude), and establishing and maintaining final approach heading and glide slope. The auto-land system is capable of adjusting power, flair for landing and ground rollout after landing. These capabilities are available on most commercial airlines equipped for Category 3 landings. In order to provide a fully autonomous landing, additional capabilities that may need to be added include lowering of landing gear, flap adjustments, spoiler control, etc. The extent of modifications necessary to access these navigation and control functions are dependent on the age of the aircraft and the extent of modernization. For example, aircraft of recent design have electronic cockpits, electronic flight control capability, navigation and control systems that utilize GPS and Category 3 landing systems. The flight control computers provide external bus connections to other systems. This bus may be used to interface to the AESCS.

The Ground Control Segment (GCS) 30 of the present invention is incorporated into one or more monitoring and control stations 130*a*, 130*b*, and 130*c*. These stations may be integrated with an existing Air Traffic Control (ATC) network, or may be located at other physical facilities and receive information collected from ATC facilities. The purpose of the GCS 30 is to continuously monitor aircraft to determine abnormal flight patterns, detect threatening behavior onboard the aircraft, or otherwise determine situations which may pose a hazard to either the aircraft or ground locations.

The GCS 30 includes features such as a "911" equivalent for flight communications, the monitoring of transponder messages for emergency or hijacking codes, and the monitoring of communications channels for cockpit alarms. The GCS 30 may also include more sophisticated capabilities that include correlating planned flight paths with actual flight paths, and detecting significant deviations from normal operations or loss of aircraft systems that pose a threat to the aircraft.

The source of information for the GCS is obtained from numerous sources. The primary source of information is via the emergency control system communications channel 10, which is described below. This channel or link 10 provides, not only data from the aircraft systems, but also cockpit and cabin audio and video information. New ATC systems will integrate complimentary aircraft data including position, altitude, velocity, destination, and the like. This data on each flight is forwarded to the GCS. The GCS integrates this data into a complete database to provide full situational awareness for each aircraft.

The communications segment may comprise multiple complimentary and alternative communications channels. For positive control, two-way communications is desired, although one-way communication could also be utilized. The minimum data rate required is relatively low since the intent is to provide basic aircraft monitoring while communicating navigation and control information to the aircraft, not actually flying the aircraft by remote control. The communications channels should, however, be secure, i.e. encrypted. Communications channels can be established using existing VHF or UHF communications equipment. Even though the channel is completely unused most of the time, it is preferably maintained in a "clear" condition at all times such that the channel is always available when needed. Ground-based transmitters and receivers supporting the AESCS are deployed throughout the operational areas. Preferably, the ground-based transmitters and receivers are co-located with ATC radio transceivers, navigation systems or other aircraft ground equipment.

Another approach to providing communications between the aircraft and the GCS is to utilize a Satellite Communications System (SCS). An advantage of utilizing a SCS is that worldwide coverage is made available, and such world wide coverage can be effected in a short amount of time. Another advantage of using SCS is that these systems are also relatively immune to problems associated with terrestrial communications systems, including Line-of-Sight issues, total coverage of the operational area, bandwidth restrictions, maintenance of the ground segment, and the like.

Other communications alternatives could also be implemented, including the use of existing aircraft channels (such as those used for DME) to implement two-way emergency data communications. Such dual use has been demonstrated for military applications that share the 960–1200 MHz DME/TACAN band for military data communications (JTIDS). Ground terminals are deployed and co-located at existing ATC locations. In fact, it is possible to modify existing ground stations to include such functionality.

In a preferred embodiment, the communications segment makes use of digital communication techniques and employs packet protocols for reliable data communications between the aircraft and the ground. The information from these ground terminals is communicated to AESCS monitor and control points by existing communications means, including, but not limited to, microwave radio, fiber optic cables, copper cables, and satellite communications links.

Once the presence of an emergency situation on board an aircraft has been detected the GCS sends a command via the communications link to the aircraft. The command sequence sent to the aircraft from the GCS by way of the communications link might comprise a message that removes control of the aircraft from the cockpit and places it with the onboard electronic systems. This message would then be followed with detailed flight information. Such detailed flight information provided by the GCS may include climb to a specific altitude, assume a particular heading, navigate to a particular way-point, proceed to a specified destination, initiate a particular procedure, etc. In one embodiment, such commands are not issued by a single individual and require authentication of the individuals initiating the change in control. The control messages should also be encrypted to insure that unauthorized persons could not assume control of the aircraft from illegitimate ground stations. Acknowledgment from the aircraft could also be required before final transfer of control.

As discussed above, the preferred and maximum performance system is based on maximum use of electronic systems installed on most modern airliners. Such systems provide the ability to navigate and control the aircraft autonomously in the case of an emergency. Modifications required on all commercial airliners include the addition of cockpit and cabin audio and video monitoring equipment, emergency access control functions, security code functions and interface to the emergency communications link. Security features may include electronic ID of crew members such as by fingerprints or face recognition, remote control of the transponder including mode and code word changes, emergency disabling of cockpit controls including engine, electrical, fuel and cabin pressure controls, and the like.

Other aircraft that are not commercial airliners are also at risk. For example, one target aircraft is the crop duster. Most crop dusters are provided with only a minimal set of electronics. General aviation aircraft also carry a minimal set of electronics. Other aircraft that are at risk include equipment used for transporting only freight, turbo-prop aircraft not equipped with the most sophisticated electronics, aircraft designed for agriculture applications, and smaller general aviation aircraft. Even though the threat of small, single-engine aircraft for destruction of major buildings may be deemed low, it is never the less real. Therefore, a means for reducing the threat by such general aviation aircraft is included as part of the present invention.

Older and/or smaller aircraft designs may be more difficult to modify to incorporate the full capabilities of the AESCS. It may be necessary to upgrade these aircraft to full Category 3 landing capability in order to incorporate the full range of capability of the AESCS. However, the incorporation of full Category 3 landing capability implies the use of equipment that may be used on a routine flight basis to land at a wide range of airports. Such equipment may impose additional maintenance and certification costs that are not acceptable for these aircraft. As an alternative, equipment may be used which is not as precise, and hence, is less expensive, but may be restricted to use only at selected airports and certified for emergency use only. In the interest of reducing time and cost to implement, the minimum capability AESCS may require the establishment of designated airports to accommodate aircraft with emergency situations. These locations would have long runways, minimal number of structures located in close proximity to runways, long runway overrun areas, enhanced safety facilities to handle emergencies, etc.

Lower, level emergency control measures can be incorporated for these types of aircraft as well. Some minimal equipment installation and modification may be required. This represents a potential costly modification for small aircraft. The addition of a complete auto-landing capability would be far more than the value of the aircraft itself; hence some other alternative is required. Alternatives include incorporating emergency engine shut-off, electromechanical control locks, pre-programmed flight profiles, etc. All of these alternatives have safety risk associated with the aircraft.

While detecting an emergency condition on an aircraft is vitally important, it is just as important to prevent false alarms as it is to detect emergency situations. Therefore reducing dependency on the human element to access the status of each aircraft is desirable. The GCS includes the ability to isolate the potential emergency situations from the vast majority of normal situations. Questionable situations are flagged and presented to an operator for final resolution. The operator is provided with information from multiple sources along with the criticality of the situation. Confirmation of an emergency situation, for example the confirmation that a specific aircraft is under the control of an unauthorized person or persons, would result in a set of options from which the operator would choose a particular course of action. If justified, the GCS operator, with concurrence from at least one other GCS operator, would issue a command to the aircraft that would enable the GCS to assume control of the aircraft. This control would not be the actual direct control of the aircraft, but the ability to program the flight profile of the aircraft into the aircraft's navigation system. The on board navigation and control systems would be responsible for the actual second-by-second flight of the aircraft.

Figure 3:
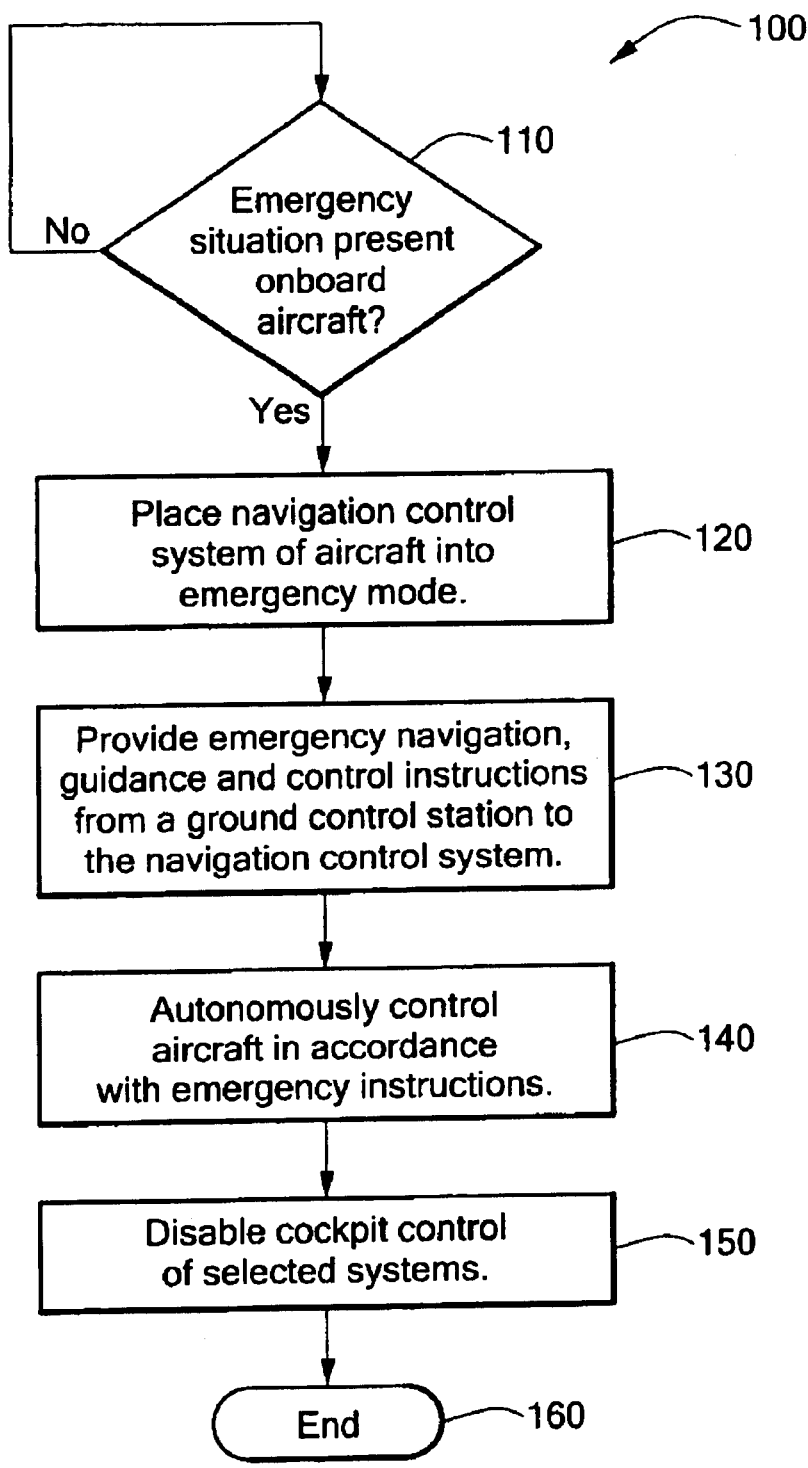
FIG. 3 is a flow chart of the method of the present invention.

Referring now to FIG. 3, a block diagram showing the method 100 of providing an AESCS system is shown. The rectangular elements are herein denoted "processing blocks" and may represent computer software instructions or groups of instructions. The diamond shaped elements, are herein denoted "decision blocks," and may represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order. Furthermore, these steps represent those typical of the full embodiment of the invention. Modifications may be incorporated into systems having reduced capabilities.

Step 110 shows that the aircraft is continuously monitored to determine if there is an emergency situation onboard. The above described GCS includes one or more monitor and control stations which monitor the aircraft to determine when an emergency situation exists. When there is no emergency situation, this step is repeated. When an emergency situation is detected step 120 is executed.

Step 120 places the navigation control system of the aircraft into emergency mode. When the navigation control system is placed into emergency mode, control of the aircraft is switched to an onboard autonomous control system. The pilot has no control over the flight of the aircraft at this point.

Step 130 provides emergency navigation, guidance and control instructions to the autonomous control system. These emergency instructions are provided from the GCS to the autonomous control system by way of the communications link.

As recited in step 140, the aircraft is controlled by way of the autonomous control system and the emergency instructions which have been provided to the autonomous control system. Accordingly, the aircraft can be directed to a predetermined location, and landed safely despite the fact that there is an emergency situation on board.

At step 150 the cockpit control of selected systems is disabled. This step prevents a person from disabling the aircraft, such as by turning off power to the control systems, emptying the gas tanks, and other acts to prevent a safe landing of the aircraft. At step 160 the method is completed.

By way of the above described method and apparatus, control of the aircraft is removed from the control of unauthorized person or persons onboard the aircraft, and the aircraft is directed to a destination that is considered a safe location for the aircraft given it's status, and to facilitate a reasonably safe emergency landing. It should be noted that the system can be used to control the aircraft in the event the crew is incapacitated due to other causes, e.g., medical, loss of oxygen, etc.

Another issue addressed by this invention is to preclude the AESCS itself from being used as a means of attack. Once such a means of taking control of an aircraft exits, care must be taken to ensure that the control of the aircraft is not inadvertently changed, or an unauthorized person or persons cannot usurp control. For example, if hostile forces know of such an emergency ground control link, it is possible for them to attempt to exploit the AESCS as a means of controlling the aircraft. Therefore, any casual implementation of a safety control system could lead to a "back door" threat, and such a deficiency must be avoided. The present invention addresses these concerns as well. In one embodiment, the commands required to take control of the aircraft are not issued by a single individual and require authentication of the individuals initiating the change in control. The control messages are encrypted to insure that unauthorized persons could not assume control of the aircraft from illegitimate ground stations. Acknowledgment from the aircraft is required before final transfer of control.

The biggest risk that must be overcome is to ensure that the AESCS can not accidentally place the aircraft into a threat mitigation mode when no threats exist. This is accomplished at two levels. First, the onboard equipment is designed to incorporate the fail-safe design features associated with aircraft. Second, the communications channel should include the use of multiple acknowledgements of receipt and execution of commands. Finally, the ultimate decision to take preemptive control of an aircraft rests with two or more ground personnel.

Removing the ability to gain unauthorized control of the aircraft is relatively simple, but ensuring that the aircraft can be placed under safe positive control of an autonomous system requires more diligence. For example, aircraft engines can be shut down, electrical power can be removed, fuel flow can be reduced, etc. from the cockpit by the unauthorized party. Such actions by unauthorized individuals could result in catastrophic loss of the aircraft in an uncontrolled manner. It would, therefore, be desirable to remove access to all aircraft systems from within the cockpit in an emergency situation. Such capability would prevent, for example, the intentional crash of an aircraft by a mentally deranged crewmember or hijacker. However, one example of a difficult modification is one that would prevent the setting of switches or circuit breakers to undesired positions from the cockpit by individuals with malevolent intentions. Hence, it may not be practical to incorporate all features of the AESCS into all aircraft.

One of the features of this invention is scalability and flexibility. The present invention provides a range of cost-effective approaches for aircraft of varying degrees of sophistication and capability. For example, crop dusters do not have all of the electronic technology of commercial airliners, nor do most general aviation aircraft. However, a version of the present invention similar to a so-called "dead man's throttle" approach can be implemented at reasonable costs.

International aspects of aviation are also addressed by the present invention. Although one motivation for developing the inventive concept is to thwart attempts to use domestic aircraft to attack the homeland, the safety control link capability has been extended to address the use of commercial international flights to attack the homeland, the use of rogue military aircraft to attack civilian targets, the use of commercial airliners as weapons in other countries and the use other aircraft to attack civilian targets.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that the invention should not be limited to the described embodiments but rather should be limited only by the spirit and scope of the appended claims. All publications and references cited herein are expressly incorporated herein by reference in their entirety.

What is claimed is:

1. An aircraft emergency safety control system comprising:
   a monitor and control station capable of monitoring an aircraft and determining the presence of an emergency situation onboard the aircraft;
   a communications system providing communication between the aircraft and said monitor and control station; and
   a navigational system capable of providing autonomous control of the aircraft upon receipt of a signal from said monitor and control station, and wherein said navigation system is capable of disabling cockpit control of selected systems of the aircraft.

2. The system of claim 1 wherein said navigation system accepts emergency navigation, guidance, and control instructions from said monitor and control station via said communications system.

3. The system of claim 1 wherein said cockpit control includes at least one of engine controls, electrical controls, fuel controls and cabin pressure controls.

4. The system of claim 1 wherein said navigation system comprises a three-dimensional navigation system including at least one of a full-control 3-axis autopilot, sensors for determining forward velocity, sensors for determining vertical velocity, sensors for determining roll, sensors for determining roll-rate, sensors for determining yaw, sensors for determining heading, sensors for determining angle of attack, sensors for determining ground speed, sensors for determining attitude and sensors for determining horizontal drift.

5. The system of claim 1 wherein said monitor and control station and said navigational system are capable of vectoring the aircraft to programmed way points and establishing and maintaining final approach heading and glide slope.

6. The system of claim 1 wherein said navigation comprises an autoland system capable of adjusting at least one of power, flair for landing and ground rollout after landing.

7. The system of claim 1 wherein said navigation system is capable of at least one of lowering of landing gear, flap adjustments, and spoiler control.

8. The system of claim 1 wherein said monitoring and control station is integrated with an existing Air Traffic Control (ATC) network.

9. The system of claim 8 wherein said monitor and control station receives information collected from said ATC network.

10. The system of claim 1 wherein said monitor and control station continuously monitors the aircraft to determine at least one of abnormal flight patterns, situations which may pose a hazard to either the aircraft or ground locations, emergency codes, cockpit alarms, and loss of aircraft systems that pose a threat to the aircraft.

11. The system of claim 1 wherein said monitor and control station correlates planned flight paths with actual flight paths and detects significant deviations from normal operations.

12. The system of claim 1 wherein said monitor and control station monitors at least one of cockpit audio, cockpit video, cabin audio, and cabin video.

13. The system of claim 1 wherein said monitor and control station provides a command sequence to said navigational system which places control of the aircraft with onboard electronic systems.

14. The system of claim 13 wherein said monitor and control system provides flight information to said onboard electronic systems.

15. The system of claim 14 wherein said flight information includes at least one of climb to a specific altitude, assume a particular heading, navigate to a particular waypoint, proceed to a specified destination, and initiate a particular procedure.

16. The system of claim 1 wherein said communications system comprises a system including at least one of a one-way communication system, a two-way communication system, a VHF communications system, a UHF communications system and a satellite communications system.

17. The system of claim 1 wherein communications over said communications system are encrypted.

18. A method of providing an aircraft emergency safety control system comprising:
   monitoring an aircraft with a monitor and control station;
   determining the presence of an emergency situation onboard the aircraft;
   communicating between the aircraft and said monitor and control station by way of a communications link;
   taking autonomous control of the aircraft upon receipt of a signal to do so from said monitor and control station; and
   disabling cockpit control of selected systems of the aircraft.

19. The method of claim 18 wherein said taking autonomous control of the aircraft includes accepting emergency navigation, guidance, and control instructions from said monitor and control station via said communications link.

20. The method of claim 18 wherein said cockpit control includes at least one of engine controls, electrical controls, fuel controls and cabin pressure controls.

21. The method of claim 18 wherein said taking autonomous control of the aircraft includes at least one of vectoring the aircraft to programmed way points, establishing and maintaining final approach heading and glide slope, adjusting power, adjusting flair for landing, adjusting ground rollout after landing, lowering of landing gear, flap adjustments, and spoiler control.

22. The method of claim 18 further comprising receiving information collected from an ATC network.

23. The method of claim 18 wherein monitoring an aircraft includes at least one of monitoring cockpit audio, monitoring cockpit video, monitoring cabin audio, monitoring cabin video, determining abnormal flight patterns, determining situations which may pose a hazard to either the aircraft or ground locations, monitoring the aircraft for emergency codes, monitoring the aircraft for cockpit alarms, correlating planned flight paths with actual flight paths and detecting significant deviations from normal operations, and monitoring the aircraft for loss of aircraft systems that pose a threat to the aircraft.

24. The method of claim 18 wherein taking autonomous control of the aircraft includes providing a command sequence to a navigational system of the aircraft which places control of the aircraft with onboard electronic systems.

25. The method of claim 18 wherein taking autonomous control of the aircraft includes providing flight information to the onboard electronic systems.

26. The method of claim 25 wherein said providing flight information includes at least one of climbing to a specific altitude, assuming a particular heading, navigating to a particular way-point, proceeding to a specified destination, and initiating a particular procedure.

27. The method of claim 18 wherein said communicating between the aircraft and said monitor and control station is accomplished by way of at least one of a one-way communications system, a two-way communications system, a VHF communications system, a UHF communications system, and a satellite communications system.

28. The method of claim 18 wherein said communicating is done using encryption.

* * * * *

UNITED STATES PATENT AND TRADEMARK OFFICE
CERTIFICATE OF CORRECTION

PATENT NO. : 6,739,556 B1
APPLICATION NO. : 10/300141
DATED : May 25, 2004
INVENTOR(S) : James L. Langston It is certified that error appears in the above-identified patent and that said Letters Patent is hereby corrected as shown below:

In the Abstract, line 9 delete "it's and replace with --its--.

Column 2, line 14 delete "via-the" and replace with --via the--.

Column 3, line 40 delete "preempting" and replace with --pre-empting--.

Column 3, line 55 delete "programed" and replace with --programmed--.

Column 6, line 62 delete "safety risk" and replace with --safety risks--.

Column 7, line 58 delete "detected step 120" and replace with --detected, step 120--.

Column 8, line 8 delete "landed" and replace with --land--.

Column 8, line 9 delete "it's" and replace with --its--.

Column 8, line 44 delete "can not" and replace with --cannot--.

Column 9, line 22 delete "use other" and replace with --use of other--.

Column 10, line 50 delete "communication" and replace with --communications--.

Signed and Sealed this

Eighth Day of August, 2006

JON W. DUDAS
*Director of the United States Patent and Trademark Office*